United States Patent
Bi et al.

(10) Patent No.: US 7,400,877 B2
(45) Date of Patent: Jul. 15, 2008

(54) METHOD OF SUPPORTING MULTIPLE SERVICE LEVELS IN A WIRELESS DATA NETWORK

(75) Inventors: Qi Bi, Morris Plains, NJ (US); Frances Jiang, Whippany, NJ (US); Carol M. Picot, Boonton Township, NJ (US); Yang Yang, Parsippany, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 492 days.

(21) Appl. No.: 10/616,553

(22) Filed: Jul. 10, 2003

(65) Prior Publication Data

US 2005/0009522 A1    Jan. 13, 2005

(51) Int. Cl.
```
H04Q 7/20      (2006.01)
H04Q 7/24      (2006.01)
H04M 3/16      (2006.01)
H04M 11/00     (2006.01)
H04B 7/00      (2006.01)
H04L 12/66     (2006.01)
H04J 3/14      (2006.01)
H04Q 7/00      (2006.01)
```
(52) U.S. Cl. .............. 455/408; 455/411; 455/426.1; 455/433.3; 370/252; 370/313; 370/465; 340/7.24; 709/225

(58) Field of Classification Search .......... 455/426, 455/435.3, 435.1, 408, 426.1, 433.3, 411; 370/465, 252, 313; 340/7.24; 709/225
See application file for complete search history.

(56) References Cited

U.S. PATENT DOCUMENTS

| | | | | |
|---|---|---|---|---|
| 5,148,472 A | * | 9/1992 | Freese et al. | 455/408 |
| 5,278,890 A | * | 1/1994 | Beeson et al. | 340/7.24 |
| 5,479,483 A | * | 12/1995 | Furuya et al. | 455/433 |
| 5,487,061 A | * | 1/1996 | Bray | 370/252 |
| 5,708,655 A | * | 1/1998 | Toth et al. | 370/313 |
| 5,944,794 A | * | 8/1999 | Okamoto et al. | 709/225 |
| 6,167,261 A | * | 12/2000 | Amin | 455/426.1 |
| 2002/0131445 A1 | * | 9/2002 | Skubic et al. | 370/465 |
| 2004/0152446 A1 | * | 8/2004 | Saunders et al. | 455/411 |
| 2005/0009522 A1 | * | 1/2005 | Bi et al. | 455/435.3 |

FOREIGN PATENT DOCUMENTS

JP          401132296      *   5/1989

* cited by examiner

Primary Examiner—William D Cumming

(57) ABSTRACT

A wireless data network distinguishes among different users connected to the network and associates each user with a service class that offers a selected level of service. The base station in the network queries the user for its unique user identification code and accesses a database linking user identification codes with their corresponding services classes. The network then controls the service level given to that user based on the service class associated with the user identification code. The user identification code can be sent to the network via existing fields in current standards.

15 Claims, 3 Drawing Sheets

METHOD OF SUPPORTING MULTIPLE SERVICE LEVELS IN A WIRELESS DATA NETWORK

BACKGROUND OF THE INVENTION

1. Field of the Invention

The present invention relates to wireless communication systems.

2. Description of the Related Art

Wireless communication systems rely on data sharing arrangements to allow multiple users to share common resources. As shown in FIG. 1, a wireless data network 100 has a plurality of base stations 102, each base station 102 acting as a communications hub for a particular coverage area, or sector 104.

Active users 106 within a given sector 104 share common resources as they communicate with the base station 102. Each base station 102 may employ a resource assignment algorithm to ensure that the resources are fairly distributed among the users 106. Wireless data networks often use a timeslot-based resource sharing channel in a forward link of the system to allocate resources. More particularly, a scheduler algorithm in the base station 102 allocates timeslot resources to all access terminals in the sector 104. For wireless users 106, each user 106 is seen by the base station 102 as an individual access terminal.

Currently known systems allocate a temporary user identification code (e.g., a unicast access terminal identifier, or UATI) when a user 106 opens a communication session with the base station 102 in the network 100. This identification code is de-allocated when the session closes and is re-allocated to a different user 106. Thus, the base station 102 treats all users 106 in the system 100 interchangeably and is not able to offer different service levels to different users. Thus, it is currently not possible to provide user-based services (e.g., user-based QoS) that can vary from user to user.

There is a desire for a method that allow differentiation among users in a wireless data network.

SUMMARY OF THE INVENTION

The present invention is directed to a method that allows the network to distinguish among different users and to link a given user with a corresponding level of service. In one embodiment, a database linking permanent user identification codes of the users with their corresponding services classes is accessed by the network when a user opens a communication session. The network queries the user for its user identification code and controls the service level given to that user based on the service class associated with the user identification code.

The user identification code can be sent to the network via existing fields in current standards, making it possible for wireless networks to incorporate the inventive method without requiring changes to any wireless standards. By providing a way to assign a permanent user identification code to each user, it is possible for a network to distinguish among different users and provide user-based service.

DETAILED DESCRIPTION

Figure 1:
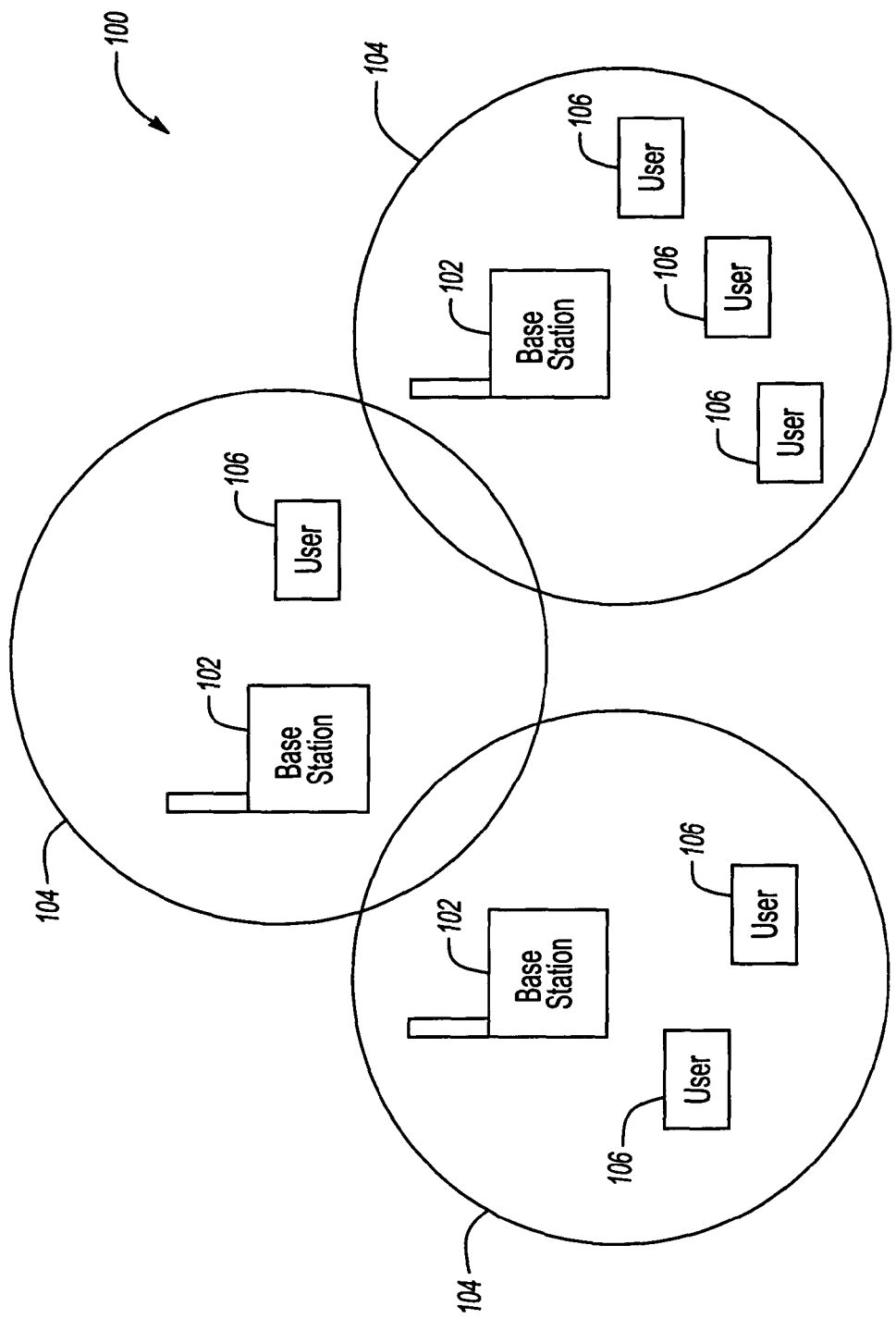
FIG. 1 is a representative diagram of a wireless communication system environment.
Figure 2:
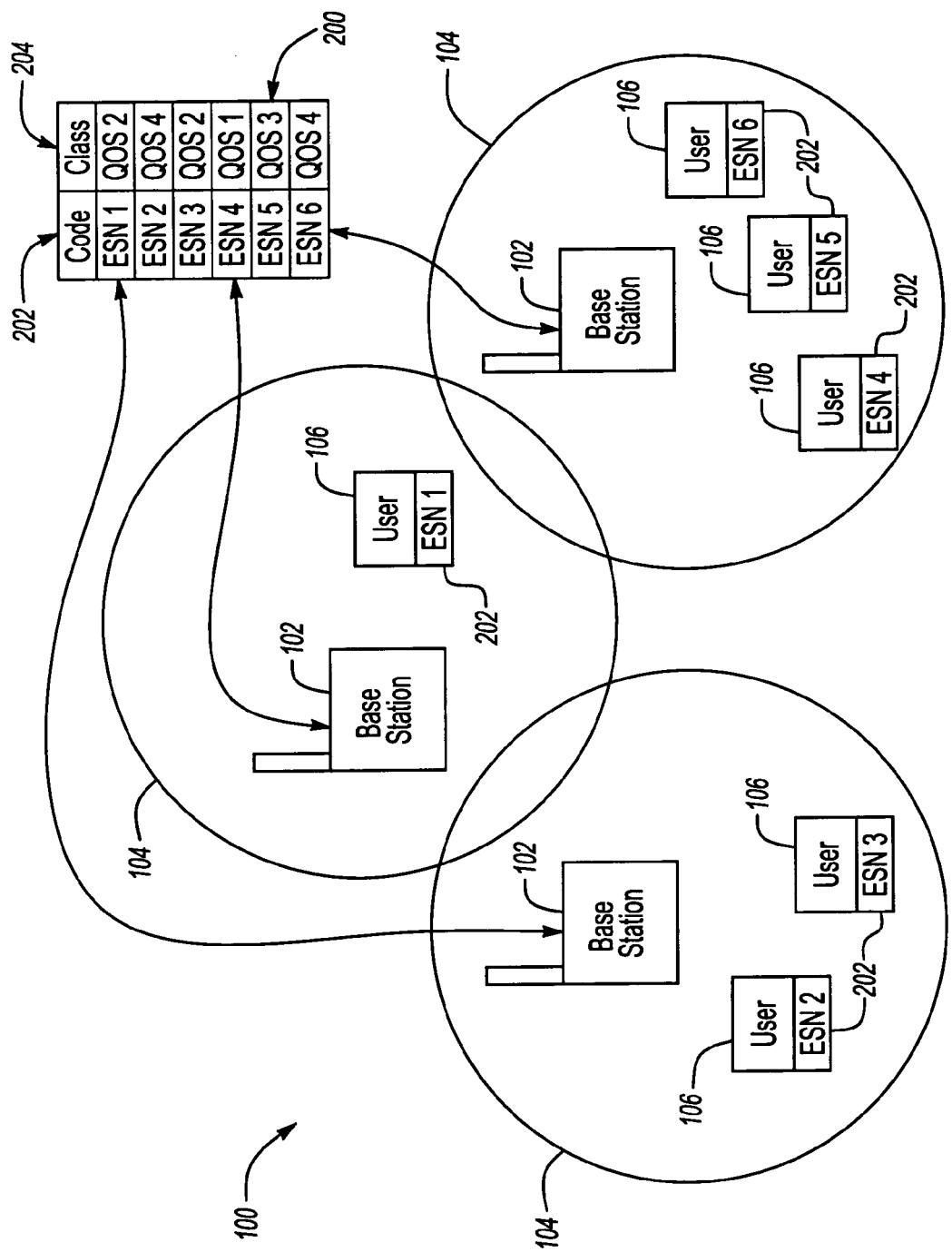
FIG. 2 is a representative diagram of a wireless communication system incorporating one embodiment of the invention.

FIG. 2 is a representative diagram illustrating a wireless network 100 incorporating one embodiment of the invention. Generally, the invention incorporates a database 200 that links a user identification code 202 (e.g., an electronic serial number (ESN) or an international mobile subscriber ID (IMSI)) that is permanently associated with a given user 106 and a service class 204. The database 200 may be located in any location accessible by the base station 102, such as a central storage location (not shown) in the network 100 or in a controller of each base station 102. The database information matches the user identification code of a given user 106 with the service class of that user. From this information, the system 100 can differentiate among users 106 and provide each user 106 with different levels of services depending on the characteristics defined in each service class. Although the example described below assumes that the service class 204 is a quality of service (QoS) class, the invention can be used to provide any user-based service and is not limited to QoS requirements.

Figure 3:
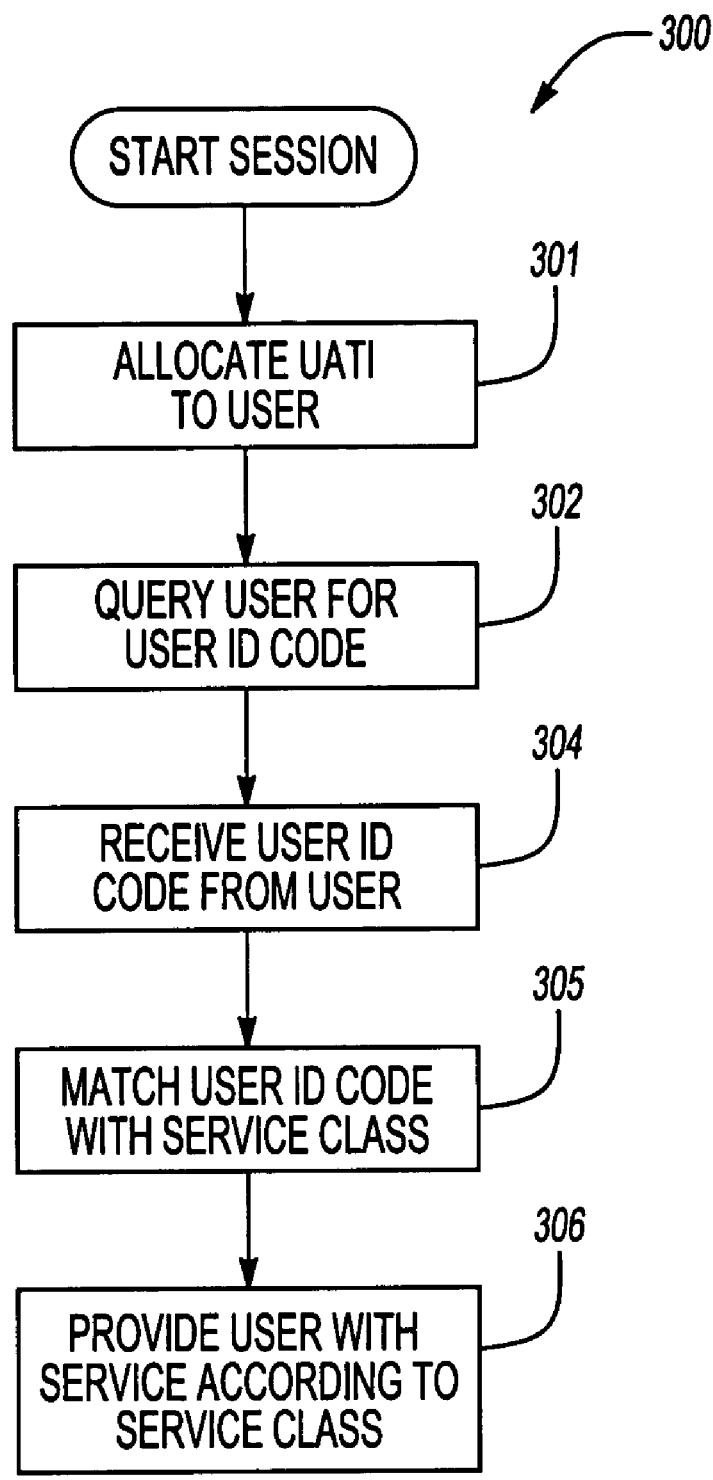
FIG. 3 is flow diagram illustrating a method according to one embodiment of the invention.

FIG. 3 is a flow diagram illustrating one embodiment of the inventive method 300. First, a communication session between the user 106 and the base station 102 is opened, and a UATI is allocated to the user (block 301). As is known in the art, the base station 102 detects that a random user 106 wants to initiate a communication session and assigns a UATI to the user 106. Once the user 106 is allocated a UATI, it has a temporary identification code that lasts for the duration of the session. As long as the user 106 does not close the communication session, it will use the same UATI each time it connects to the network 100. This is true even if the user 106 connects and disconnects from the network 100 several times within one session.

When a session is opened, the base station 102 can identify the user only through its allocated UATI, but the UATI is not enough for the base station 102 to determine the QoS class for the user 106 because the same user 106 may use different UATIs for different sessions. To link the user 106 to a specific QoS class, the base station 102 queries the user 106 for its user identification code 202 (block 302), such as the ESN. In response, the user 106 sends its user identification code 202 to the base station 102 (block 304). In one embodiment, the user 106 sends its user identification code 202 via optional message locations provided in existing standards (e.g., a message pair, such as Hardware ID Request/Hardware ID Response in the Data-Only Air Interface standard).

The base station 102 then looks up the user identification code 202 in the database 202 to find the QoS class 204 corresponding to the code 202 (block 305). As noted above, the database 200 links user identification codes 202 with service classes 204. For example, in the QoS example, the database 200 may indicate that a first set of user identification codes 202 belong to a first QoS class 204, a second set of user identification codes 202 belong to a second QoS class 204, and so on. The values for the service parameters defined in each QoS class may vary based on, for example, data transmission rates, priority, etc. In one embodiment, the network 100 checks the database 200 only when a new session is opened by the user 106 and remembers the QoS class 204 for that user 106 when the user 106 reconnects to the network 100 later during the opened session based on the user's 106 UATI. Once a particular user 106 has been linked to a particular QoS class 204, the network 100 will provide service to the user 106 based on the values corresponding to that user's QoS class 204 (block 306).

Information in the database 200 may be supplied by, for example, registering the user identification code 202 and the QoS class 204 of a mobile device when the mobile device is purchased by a buyer. The QoS class 204 can be selected by the buyer based on the desired level of service; because there are multiple possible QoS class 204 options, the buyer can customize the service level with the buyer's own usage patterns, desired transmission speed, budget, and other factors, allowing greater flexibility. In one embodiment, the mobile device can be rendered unusable until the user identification code 202 and QoS class 204 for that mobile device has been registered.

By using existing standards to transmit user identification codes 202 to the network 100, the invention allows the network 100 to distinguish among different users 106 and, if desired, offer different levels of service for each user 106. For example, as explained above, the invention can produce a system incorporating different QoS levels to allow service providers to offer different average packet data transmission rates as different service grades that can be billed at different rates, providing more flexible service overall. The invention therefore allows user-based systems to be offered in the system without requiring any changes to current wireless standards.

The invention may be incorporated in systems that connect wireline and wireless data networks together (e.g., a WiFi system). In such a system, a wireline LAN can be connected to an access terminal device that acts as a gateway device serving multiple wireline users, or gateway users. This allows the gateway users to access data in a mobile environment. Because multiple gateway users may share resources normally allocated to a single user, gateway users may have different QoS requirements than other users to maintain transmission quality. The invention gateway users to be placed in their own service class without changing the wireless standard.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A service support method in a wireless data network, comprising:
    allocating a temporary terminal identifier to a user when a session with the wireless data network is open, wherein the temporary terminal identifier is de-allocated when the session is closed;
    determining a user identification code of the user having the allocated temporary terminal identifier;
    determining a service class associated with the determined user identification code;
    associating the determined service class with the allocated temporary terminal identifier; and
    servicing the user according to the associated service class while using the allocated temporary terminal identifier to identify the user.

2. The service support method of claim 1, wherein determining the service class comprises accessing a database containing a plurality of user identification codes and at least one service, wherein each user identification code has one service class associated with it.

3. The service support method of claim 2, wherein the database comprises a plurality of service classes, each service class defining a discrete service level.

4. The service support method of claim 1, wherein the user identification code is one selected from the group consisting of an electronic serial number (ESN) and an international mobile subscriber ID (JMSI).

5. The service support method of claim 1, wherein the temporary terminal identifier is a unicast access terminal identifier (UATI).

6. The service support method of claim 1, wherein the service class is a quality of service class.

7. A service support method in a wireless data network, comprising:
    allocating a temporary terminal identifier to a user when a session with the wireless data network is open, wherein the temporary terminal identifier is de-allocated when the session is closed;
    obtaining a user identification code from the user if the user is connected to the network;
    accessing a database containing a plurality of user identification codes and a plurality of quality of service classes, each service class defining a discrete quality of service level, wherein each user identification code has a corresponding one of said plurality of quality of service classes;
    obtaining the quality of service class associated with the obtained user identification code of the user;
    associating the obtained quality of service class with the temporary terminal identifier; and
    servicing the user according to the quality of service class associated with the temporary terminal identifier.

8. The service support method of claim 7, wherein the user identification code is one selected from the group consisting of an electronic serial number (ESN) and an international mobile subscriber ID (IMSI).

9. The service support method of claim 7, wherein the temporary terminal identifier is a unicast access terminal identifier (UATI).

10. The service support method of claim 1, comprising providing the user an average packet data transmission rate corresponding to the service class.

11. The service support method of claim 1, comprising charging the user a rate corresponding to the service class.

12. The service support method of claim 7, comprising providing the user an average packet data transmission race corresponding to the obtained quality of service class.

13. The service support method of claim 7, comprising charging the user a rate corresponding to the obtained quality of service class.

14. The service support method of claim 1, comprising determining that the user is a gateway user; and
servicing the user according to a service class unique to gateway users.

15. The service support method of claim 7, comprising determining that the user is a gateway user; and
servicing the user according to a service class unique to gateway users.

* * * * *